United States Patent
Amend et al.

(10) Patent No.: US 11,159,423 B2
(45) Date of Patent: Oct. 26, 2021

(54) TECHNIQUES FOR EFFICIENT MULTIPATH TRANSMISSION

(71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

(*) Notice: Subject to any disclaimer, the term of this patent is extended or adjusted under 35 U.S.C. 154(b) by 0 days.

(21) Appl. No.: 16/967,431

(22) PCT Filed: Feb. 4, 2019

(86) PCT No.: PCT/EP2019/052663
§ 371 (c)(1),
(2) Date: Aug. 5, 2020

(87) PCT Pub. No.: WO2019/154763
PCT Pub. Date: Aug. 15, 2019

(65) Prior Publication Data
US 2021/0014153 A1    Jan. 14, 2021

(30) Foreign Application Priority Data
Feb. 6, 2018 (EP) ..................... 18155380

(51) Int. Cl.
*H04L 12/707* (2013.01)
*H04L 12/803* (2013.01)
*H04L 12/851* (2013.01)

(52) U.S. Cl.
CPC ............ *H04L 45/24* (2013.01); *H04L 47/125* (2013.01); *H04L 47/2483* (2013.01)

(58) Field of Classification Search
CPC .... H04L 45/24; H04L 47/125; H04L 47/2483
See application file for complete search history.

(56) References Cited

U.S. PATENT DOCUMENTS

| 10,687,121 B2 | 6/2020 | Yang |
| 2013/0111038 A1 | 5/2013 | Girard |

(Continued)

FOREIGN PATENT DOCUMENTS

| CN | 106302204 A | 1/2017 |
| CN | 107210828 A | 9/2017 |
| EP | 3119057 A1 | 1/2017 |

OTHER PUBLICATIONS

Huang, et al. "Packet Scheduling and Congestion Control Schemes for Multipath Datagram Congestion Control Protocol," *Computer Journal* 58, 2: 188-203 (Jan. 12, 2014). XP055473045.

(Continued)

*Primary Examiner* — Donald L Mills
(74) *Attorney, Agent, or Firm* — Leydig, Voit & Mayer, Ltd.

(57) ABSTRACT

A multipath transmission system includes a first network device and a second network device. The first network device is configured to convert an input data stream into a bundle of sub flows for transmission over a multipath transmission medium. The second network device is configured to reconvert the bundle of sub flows received via the multipath transmission medium into an output data stream. The reconversion comprises reassembling the sub flows to provide the output data stream. The conversion and reconversion are based on a network protocol that provides congestion control. The network protocol is based on non-reliable and out-of-order delivery of the bundle of sub flows. The network protocol is a multipath extension of a Datagram Congestion Control Protocol (DCCP).

13 Claims, 11 Drawing Sheets

(56) References Cited

U.S. PATENT DOCUMENTS

| | | | | |
|---|---|---|---|---|
| 2014/0351447 | A1* | 11/2014 | Annamalaisami | .... H04L 69/163 |
| | | | | 709/227 |
| 2016/0119250 | A1* | 4/2016 | Girard | ..................... H04L 67/28 |
| | | | | 709/226 |
| 2017/0366445 | A1* | 12/2017 | Nemirovsky | ........... H04L 45/24 |
| 2018/0139136 | A1 | 5/2018 | Yong | |
| 2018/0241727 | A1* | 8/2018 | Verzun | ...................... H04L 9/34 |
| 2020/0145324 | A1* | 5/2020 | Wei | ..................... H04L 61/2007 |

OTHER PUBLICATIONS

Kohler, et al. "Datagram Congestion Control Protocol (DCCP)," RFC No. 4340: 1-18 (Mar. 31, 2006). XP002780872.

\* cited by examiner

TECHNIQUES FOR EFFICIENT MULTIPATH TRANSMISSION

CROSS-REFERENCE TO PRIOR APPLICATIONS

This application is a U.S. National Phase Application under 35 U.S.C. § 371 of International Application No. PCT/EP2019/052663, filed on Feb. 4, 2019, and claims benefit to European Patent Application No. EP 18155380.1, filed on Feb. 6, 2018. The International Application was published in English on Aug. 15, 2019 as WO 2019/154763 A1 under PCT Article 21(2).

TECHNICAL FIELD

The invention relates to techniques for efficient multipath transmission, in particular multipath transmission of hybrid access data traffic. The invention relates to a multipath transmission system, a network device and a method for multipath transmission. The disclosure particularly relates to Multipath DCCP (Datagram Congestion Control Protocol), a technique for combining multiple communication paths for OSI (Open Systems Interconnection) network layer 2 and higher.

BACKGROUND

Hybrid Access (HA) as shown in FIG. 1 combines at least two different network links with the same or different network technology; for example, it combines access over a fixed network with access over a cellular network. Traffic is distributed over multiple unknown and fluctuating paths. Multipath bundling protocols (MBP) have to manage the different paths and contain algorithm(s) for path aggregation. The challenge for such algorithms lies in the data distribution over the paths and if needed, a reordering unit to bring the data stream in the right order again, such that the receiver can make use of it. The challenge to efficiently distribute hybrid access data traffic over multiple paths has not yet been solved. Until today, no approach is known which efficiently bundles multiple unknown and fluctuating paths into a single logical path.

SUMMARY

In an exemplary embodiment, the present invention provides a multipath transmission system. The multipath transmission system includes a first network device and a second network device. The first network device is configured to convert an input data stream into a bundle of sub flows for transmission over a multipath transmission medium. The second network device is configured to reconvert the bundle of sub flows received via the multipath transmission medium into an output data stream. The reconversion comprises reassembling the sub flows to provide the output data stream. The conversion and reconversion are based on a network protocol that provides congestion control. The network protocol is based on non-reliable and out-of-order delivery of the bundle of sub flows. The network protocol is a multipath extension of a Datagram Congestion Control Protocol (DCCP).

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
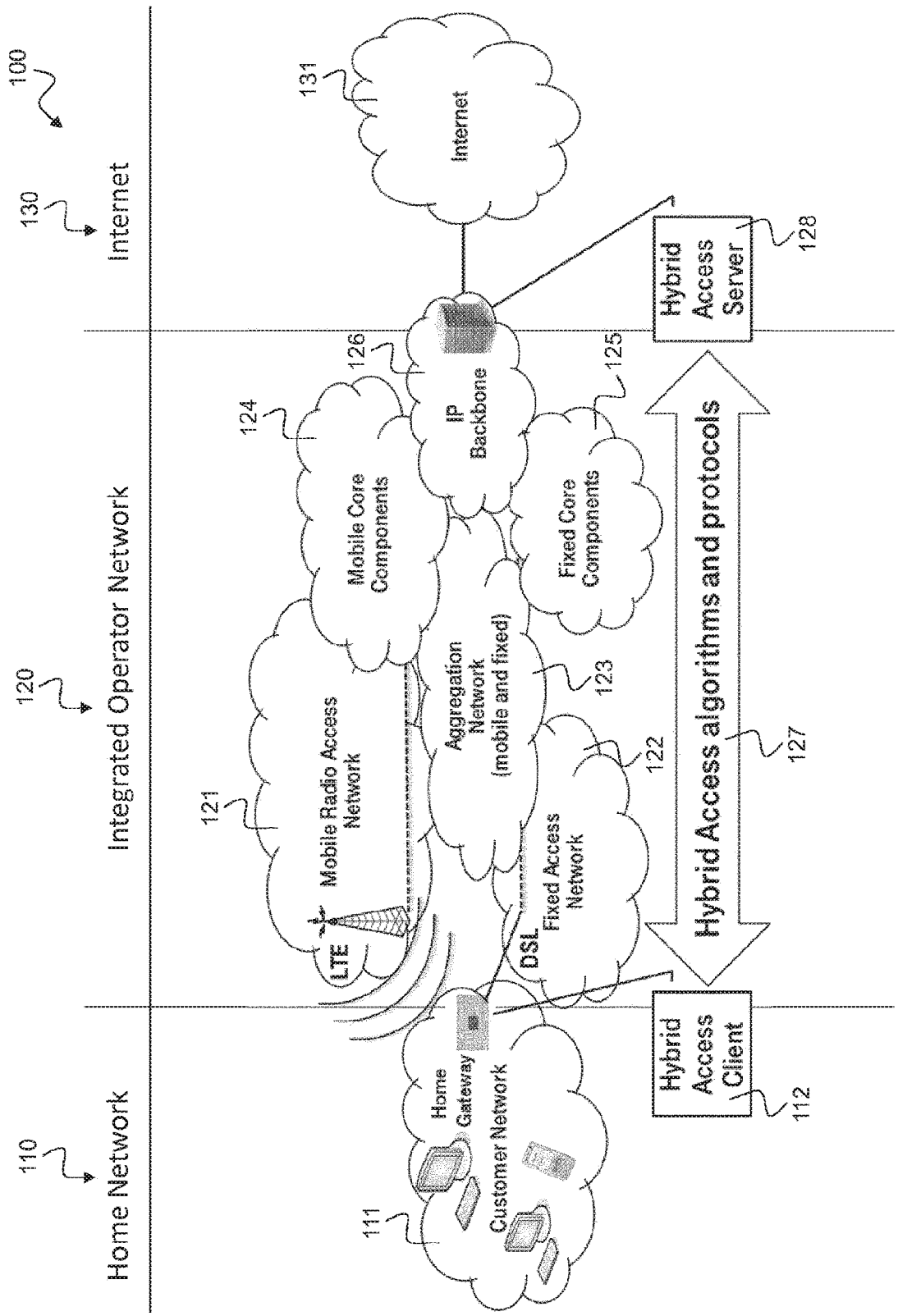
FIG. 1 shows a reference topology 100 for Hybrid Access (HA)

Exemplary embodiments of the present invention efficiently distribute data traffic over multiple paths, in particular for the hybrid access scenario as exemplarily depicted in FIG. 1.

Exemplary embodiments of the present invention provide a new multipath bundling protocol for bundling data traffic in the hybrid access environment.

In this disclosure a solution for MBP is presented, which exploits the well working Transmission Control Protocol (TCP) channel estimation and at the same time offers transfer of stateless protocols like User Datagram Protocol (UDP) or Internet Protocol (IP) without imposing TCP behavior, which repeal on the one hand the stateless properties and on the other hand introduce head-of-line blocking by ensuring in-order delivery.

Head-of-line-blocking is a performance limiting phenomenon that occurs when a line of packets is held up by the first packet. Examples include input buffered network switches, out-of-order delivery and multiple requests. Head-of-line-blocking blocks data traffic until a packet gap is filled. Out-of-order delivery occurs when sequenced packets arrive out of order. This may happen due to different paths taken by the packets or from packets being dropped and resent. In-order delivery occurs when sequenced packets arrive in sequence. Flow control is a control that ensures in-order delivery. Congestion control modulates traffic entry into a telecommunications network in order to avoid congestive collapse resulting from oversubscription. This is typically accomplished by reducing the rate of packets and it should not be confused with flow control, which prevents the sender from overwhelming the receiver. Congestion control includes techniques such as exponential backoff, fair queueing, priority schemes, etc.

Exemplary embodiments of the disclosure enhance the plain old Datagram Congestion Control Protocol (DCCP), that is, a network protocol which inherits congestion control from TCP, without ensuring delivery and the along coming head-of-line blocking in case of data loss. This behavior exactly matches the requirements of path estimation without imposing flow control. This mechanism of the standardized protocol DCCP is developed further towards a multipath capable protocol MP-DCCP in accordance with the present disclosure. MP-DCCP creates several DCCP flows, bundles them and respectively manages them. The DCCP protocol as such needs no special extensions which changes the standard, but the MP-DCCP may be standardized as such in future.

The methods and systems presented below may be of various types. The individual elements described may be realized by hardware or software components, for example electronic components that can be manufactured by various technologies and include, for example, semiconductor chips, application-specific integrated circuits (ASICs), microprocessors, digital signal processors, integrated electrical circuits, electro-optical circuits and/or passive components.

The devices, systems and methods presented below are capable of transmitting information over a communication network. The term communication network refers to the technical infrastructure on which the transmission of signals takes place. The communication network comprises the switching network in which the transmission and switching of the signals takes place between the stationary devices and platforms of the mobile radio network or fixed network, and the access network in which the transmission of the signals takes place between a network access device and the communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal as described above, for example, a mobile phone or a mobile device with mobile adapter or a machine terminal. In the fixed network, the access network includes, for example, a DSLAM (digital subscriber line access multiplexer) to connect the communication terminals of multiple participants based on wires. Via the switching network the communication can be transferred to other networks, for example other network operators, e.g. foreign networks.

In the following, network protocols, also denoted as communication protocols are described. A network protocol is a system of rules that allow two or more entities of a communications system to transmit information via a communication channel or transmission medium. The network protocol defines the rules "Syntax", "Semantic" and "Synchronization" of communication and possible error detection and correction. Network protocols may be implemented by computer hardware, software, or a combination of both. Communicating systems use well-defined formats for exchanging various messages. Each message has an exact meaning intended to elicit a response from a range of possible responses pre-determined for that particular situation. The specified behavior is typically independent of how it is to be implemented. Communication protocols have to be agreed upon by the parties involved. To reach agreement, a network protocol may be developed into a technical standard. Multiple protocols often describe different aspects of a single communication. A group of (network) protocols designed to work together are known as a (network) protocol suite; when implemented in software they are a (network) protocol stack. Internet communication protocols are published by the Internet Engineering Task Force (IETF). The IEEE handles wired and wireless networking, and the International Organization for Standardization (ISO) handles other types.

In communications and computing systems, the Open Systems Interconnection model (OSI model) defines a conceptual model that characterizes and standardizes the communication functions without regard to its underlying internal structure and technology. Its goal is the interoperability of diverse communication systems with standard protocols. The model partitions a communication system into abstraction layers. The original version of the model defined seven layers: Physical layer (Layer 1), Data Link layer (Layer 2), Network layer (Layer 3), Transport layer (Layer 4), Session layer (Layer 5), Presentation layer (Layer 6) and Application layer (Layer 7).

According to a first aspect the invention relates to a multipath transmission system, comprising: a first network entity configured to convert an input data stream into a bundle of sub flows for transmission over a multipath transmission medium; and a second network entity configured to reconvert the bundle of sub flows received via the multipath transmission medium into an output data stream, wherein the conversion and reconversion are based on a network protocol that provides congestion control without ensuring delivery nor in-order delivery of the bundle of sub flows.

By such a multipath transmission system, data traffic can be efficiently distributed over multiple paths due to the network protocol that provides congestion control without ensuring delivery nor in-order delivery.

Stateful and stateless are adjectives that describe whether a computer or computer program is designed to note and remember one or more preceding events in a given sequence of interactions with a user, another computer or program, a device, or other outside element. Stateful means the computer or program keeps track of the state of interaction, usually by setting values in a storage field designated for that purpose. Stateless means there is no record of previous interactions and each interaction request has to be handled based entirely on information that comes with it. Stateful and stateless are derived from the usage of state as a set of conditions at a moment in time. The Internet Protocol is an example of a stateless interaction. Each packet travels entirely on its own without reference to any other packet. Stateless transmission has the advantage that no interruptions occur during data transmission due to retransmission of lost packets. At the receiver side, a lost packet may be replaced by some packet estimate, e.g., by playing the previous packet again in order to fill the gap and avoid pauses.

Figure 7:
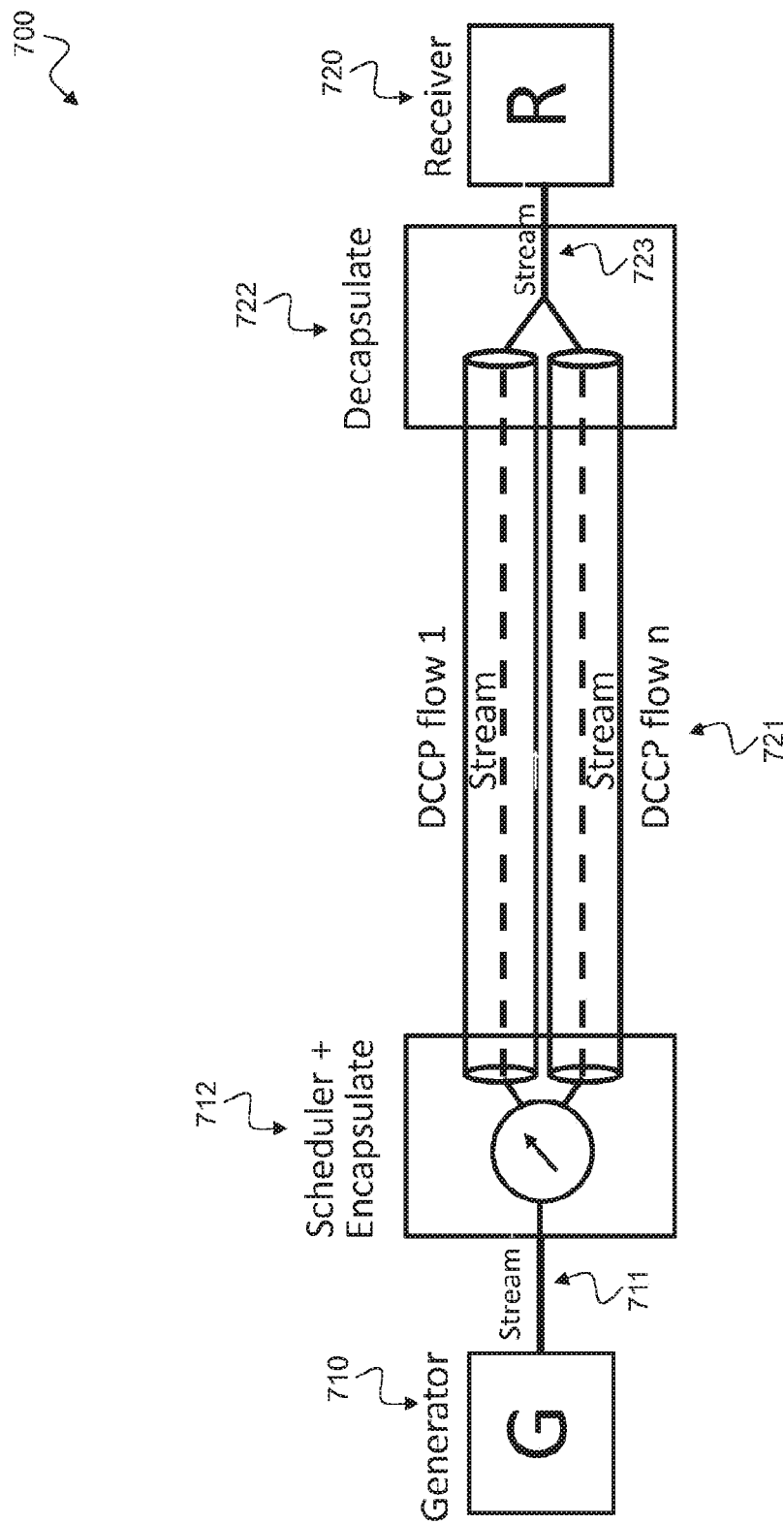
FIG. 7 shows a Multipath DCCP encapsulation converter 700 according to the disclosure.

DCCP as such is stateful because it maintains session states, but it does not ensure delivery nor in-order delivery. A congestion control, based on receiver feedback (an incomplete flow control), is inherited with path capacity estimation properties to not overload the available path capacity resources. With respect to FIG. 7 described below, MP-DCCP is capable of transmitting stateless protocols as UDP or IP, without imposing stateful behavior to the respective transmitted protocol nor ensuring (in-order) delivery. MP-DCCP as shown in FIG. 7 only imposes congestion control.

TCP is stateful as well and inherits flow- and congestion control which ensures, compared to DCCP, in-order delivery.

UDP and IP are stateless; no session information is held onto between the endpoints. This also excludes congestion- and flow control. Data is just sent without knowledge about the path and no information about reception.

If the number of data packets in a network exceeds a certain value, the network becomes overloaded and its performance drops. This is the case when capacity towards destination does not match the traffic demand, e.g., due to link capacity limitations or cache buffer scarcity. Due to the overload, the network needs more time to handle and remove the overload situations, congestion and conflicts. The above described network protocol providing congestion control avoids such bottlenecks.

Hence, the multipath transmission system according to the first aspect provides a solution for an efficient distribution of data traffic over multiple paths. By using the newly introduced multipath bundling of sub flows transmission over the multipath transmission medium can be significantly improved and thus results in improved quality of experience (QoE) for the user, especially for the hybrid access scenario as described above.

In an exemplary implementation form of the multipath transmission system, the network protocol is a multipath extension of a Datagram Congestion Control Protocol (DCCP).

The plain old Datagram Congestion Control Protocol (DCCP) according to "E. Kohler, M. Handley, S. Floyd, "*Datagram Congestion Control Protocol (DCCP)*", RFC no. 4340, March 2006" is a protocol, which inherits congestion control from TCP, without ensuring delivery. This behavior exactly matches the requirements of path estimation without imposing flow control. This mechanism of the standardized protocol DCCP, is applied towards multipath transmission to obtain a multipath capable protocol MP-DCCP. The main idea of MP-DCCP is to create several DCCP flows and bundle respectively manage them (see FIG. 5 described below). The DCCP protocol as such needs no special extensions which changes the standard.

In an exemplary implementation form of the multipath transmission system, the network protocol is based on non-reliable delivery of the bundle of sub flows.

A network protocol providing non-reliable delivery of the bundle of sub flows is easier to implement than a network protocol providing reliable data delivery.

Non-reliable transmission has the advantage that no interruptions occur during data transmission due to retransmission of lost packets to ensure reliability. At the receiver side, a lost packet may be replaced by some packet estimate, e.g., by playing the previous packet again in order to fill the gap and avoid pauses. In reliable transmission the receiver has to wait until the lost packet is retransmitted. Hence, non-reliable transmission improves user's quality of experience in the case of distorted transmission, in particular for real-time traffic.

In an exemplary implementation form of the multipath transmission system, the network protocol is based on service detection which is configured to detect services included in the input data stream, wherein the services are detected based on at least one of the following characteristics of the input data stream: source address, destination address, deep packet inspection, traffic pattern.

This provides the advantage that by using service detection each service can be specifically transmitted according to its requirement. For example, real-time traffic such as speech or voice traffic can be transmitted by a high quality transmission path while non real-time traffic such as file downloads or also video downloads can be transmitted by using less reliable transmission paths. In other scenarios, services can benefit from capacity aggregation or seamless handover between flows of a bunch of flows. Such a differentiation between the different services improves QoE.

In an exemplary implementation form of the multipath transmission system, the network protocol is based on path management which is configured to detect and manage available paths of the multipath transmission medium towards the second network entity.

This provides the advantage that the path management can detect different available paths, e.g., Digital Subscriber Line (DSL) paths and Long Term Evolution (LTE) paths that can be efficiently exploited for the different services with respect to an optimal transmission according to the traffic requirements.

In an exemplary implementation form of the multipath transmission system, the network protocol is based on scheduling which is configured to distribute payload units of the input data stream on the available paths of the multipath transmission medium based on a decision logic to create the bundle of sub flows.

This provides the advantage that the scheduling can provide an efficient classification of different data streams and services. Each data traffic can hence be transmitted according to its needs and in relation to other data traffic that may have higher priority or more restrictive requirements.

In an exemplary implementation form of the multipath transmission system, the network protocol is based on per path monitoring which is configured to monitor at least one of the following parameters of paths of the multipath transmission medium: capacity, latency, jitter, quality and loss.

This provides the advantage that each available path can be checked and monitored to obtain insight into the respective path characteristics. Hence an optimal allocation of different paths to the different payload data according to data requirements can be achieved.

In an exemplary implementation form of the multipath transmission system, the decision logic is based on information from the per path monitoring.

This provides the advantage that synergies can be applied. The per-path monitoring provides the relevant information which can be exploited by the decision logic to provide for an optimal transmission of all data traffic.

In an exemplary implementation form of the multipath transmission system, the network protocol is based on reordering which is configured to reorder the data received by a bundle of sub flows received at the second network entity according to a predefined sequencing, in particular according to an overall sequencing.

Such reordering provides the advantage that different path characteristics can be equalized, e.g., latency spikes scrambling or packet loss can be mitigated. Such reordering is not mandatory and can be avoided, e.g., by a good working scheduler, which equalizes beforehand or by usage of paths with same characteristic.

In an exemplary implementation form of the multipath transmission system, the network protocol comprises a policy interface which is configured to determine a policy of the service detection, the path management, the scheduling and/or the reconversion of the bundle of sub flows into the output data stream.

The policy interface can be used to flexibly define specific requirements for the network protocol and to flexibly adapt the network protocol to changing environments.

In an exemplary implementation form of the multipath transmission system, the policy of the service detection is based on one or a combination of the following options: traffic pattern of the input data stream, OSI layer protocol identifier of the input data stream, OSI layer header identifier of the input data stream, payload identifier of the input data stream.

This provides the advantage that the multipath network protocol can differentiate between traffic pattern, OSI layer protocol identifier and header identifier and thus adjust the bundling into sub flows for an optimal performance.

In an exemplary implementation form of the multipath transmission system, the policy of the path management is based on one or a combination of the following options: number of paths of the multipath transmission medium, type of paths of the multipath transmission medium (in particular mobile or fixed), latency threshold, whitelist (in particular allowable IP-addresses of paths of the multipath transmission medium), blacklist (in particular blocked IP-addresses of paths of the multipath transmission medium), per path setting of congestion control for the multipath transmission medium.

This provides the advantage that for each path the path-specific criteria such as mobile or fixed, latency, etc. can be considered and transmission over the multipath medium can be optimally adjusted.

In an exemplary implementation form of the multipath transmission system, the policy of the scheduling is based on one or a combination of the following options: flow based scheduling, stream based scheduling, packet based scheduling, service based scheduling, path prioritization, flow prioritization, application prioritization, low latency prioritization, robustness and minimum latency, round-robin, in-order delivery to avoid reordering, traffic shaping, path offloading.

This provides the advantage that scheduling can be flexibly adjusted to the different scheduling options.

In an exemplary implementation form of the multipath transmission system, the policy of the reconversion of the bundle of sub flows into the output data stream is based on one or a combination of the following options: maximum equalization time, static or dynamic equalization, buffer size, on or off.

This provides the advantage that the receiver (i.e., the second network entity) can be optimally adjusted to the used transmission options of the transmitter (i.e., the first network entity).

In an exemplary implementation form of the multipath transmission system, the first network entity is configured: to convert an input data stream comprising an OSI layer 4 payload into the bundle of sub flows without encapsulation, and to encapsulate an input data stream comprising an OSI layer 2 or OSI layer 3 payload into OSI layer 4, in particular DCCP before conversion into the bundle of sub flows.

This provides the advantage that each kind of OSI traffic can be optimally transmitted by the multipath transmission. Encapsulation can for example be applied for node-to-node data traffic, e.g., between network nodes such as gateways that use OSI Layer 2 or OSI Layer 3 traffic. Incoming higher layer data traffic can be encapsulated into OSI Layer 2 or OSI Layer 3 traffic for transportation between the two network nodes. Direct transmission (i.e., without encapsulation) can be optimally applied for end-to-end data traffic, e.g., with respect to a browser for downloading a video stream from a network server, i.e., in traffic scenarios where no encapsulation is required.

In an exemplary implementation form of the multipath transmission system, the first network entity is configured to encapsulate a stateless input data stream for a stateless transmission of the encapsulated input data stream without impressing stateful characteristics of the DCCP protocol.

This provides the advantage that stateless input traffic can be transported without the disadvantages of stateful transmission as described above.

According to a second aspect, the invention relates to a network device for converting an input data stream into a bundle of sub flows for transmission over a multipath transmission medium, the network device comprising: a path manager configured to detect and manage available paths of the multipath transmission medium; a scheduling module configured to distribute payload units of the input data stream on the available paths of the multipath transmission medium based on a decision logic to create the bundle of sub flows; and a path monitor configured to monitor at least one of the following parameters of paths of the multipath transmission medium: capacity, latency, jitter, quality and loss, wherein the decision logic is based on information from the path monitor.

By such a network device, data traffic can be efficiently distributed over multiple paths due to the different entities of the network device which provide congestion control without ensuring delivery nor in-order delivery. Hence, the network device according to the second aspect provides a solution for an efficient distribution of data traffic over multiple paths. By using the newly introduced multipath bundling of sub flows transmission over the multipath transmission medium can be significantly improved and thus results in improved quality of experience (QoE) for the user, especially for the hybrid access scenario as described above.

In an exemplary implementation form of the network device, the network device includes a policy interface, in particular a policy application program interface (API), which is configured to determine a policy of the path manager, the scheduling module and/or the path monitor.

The policy interface can be used to flexibly define specific requirements for the network protocol and to flexibly adapt the network protocol to changing environments.

In an exemplary implementation form of the network device, the path manager, the scheduling module and the path monitor are configured to implement a network protocol that is based on non-reliable delivery of the bundle of sub flows, in particular a multipath extension of a Datagram Congestion Control Protocol (DCCP).

A network protocol providing non-reliable delivery of the bundle of sub flows is easier to implement than a network protocol providing reliable data delivery. Non-reliable transmission has the advantage that no interruptions occur during data transmission due to retransmission of lost packets to ensure reliability. At the receiver side, a lost packet may be replaced by some packet estimate, e.g., by playing the previous packet again in order to fill the gap and avoid pauses. In reliable transmission the receiver has to wait for some time until the lost packet is retransmitted. Hence, non-reliable transmission improves user's quality of experience in the case of distorted transmission, in particular for real-time traffic.

According to a third aspect, the invention relates to a method for multipath transmission, the method comprising: converting an input data stream into a bundle of sub flows for transmission over a multipath transmission medium; and reconverting the bundle of sub flows received via the multipath transmission medium into an output data stream, wherein the converting and reconverting are based on a network protocol that provides congestion control without ensuring delivery nor in-order delivery of the bundle of sub flows.

By such a method, data traffic can be efficiently distributed over multiple paths due to the network protocol that provides flow control free but congestion control of the bundle of sub flows. Hence, the method according to the third aspect provides a solution for an efficient distribution of data traffic over multiple paths. By using the newly introduced multipath bundling of sub flows, transmission over the multipath transmission medium can be significantly improved and thus results in improved quality of experience (QoE) for the user, especially for the hybrid access scenario as described above.

According to a fourth aspect the invention relates to a computer program product comprising program code for performing the method according to the third aspect of the invention, when executed on a computer or a processor.

Embodiments of the invention can be implemented in hardware and/or software.

The following acronyms are applied in this disclosure:
API Application Interface
CWND Congestion Window
DCCP Datagram Congestion Control Protocol
DSL Digital Subscriber Line
GRE Generic Routing Encapsulation
HA Hybrid Access
IP Internet Protocol
LTE Long Term Evolution
MAC Media Access Control
MP Multipath
MP-DCCP Multipath DCCP
MPTCP Multipath TCP
OSI Open System Interconnection
OTT Over The Top
RTT Round Trip Time
TCP Transport Control Protocol
UDP User Datagram Protocol In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 1 shows a reference topology 100 for Hybrid Access (HA). The reference topology 100 illustrates the Home Network zone 110 with Customer Network 111 and Home Gateway with Hybrid Access Client 112, the Integrated Operator Network 120 with a variety of operator networks 121, 122, 123, 124, 125, 126 and the Internet zone 130 with the Internet 131. At the operator networks 121, 122, 123, 124, 125, 126 Hybrid Access algorithms and protocols 127 are implemented to connect the Hybrid Access Client 112 with the Hybrid Access Server 128 for connection with the Internet 131.

Hybrid Access (HA) combines at least two different network links with the same or different network technology; for example, it combines access over the fixed network 122 with access over the cellular network 121. FIG. 1 shows a typical scenario for HA but can also be implemented as an over the top (OTT) solution. The HA client 112 has at least two access interfaces, one for example for Digital Subscriber Line (DSL) access 122 and another one for example for access to the Long Term Evolution (LTE) network 121. The considerations on the HA algorithms are focused on a distributed client-server solution with client functionality in the residential gateway and server functionality (HA Server 128) in a data center at the network of the operator 126 or in the public Internet 131. However, multipath usage can be also directly applied on end devices, without having intermediate devices on behalf as shown in FIG. 2.

Figure 2:
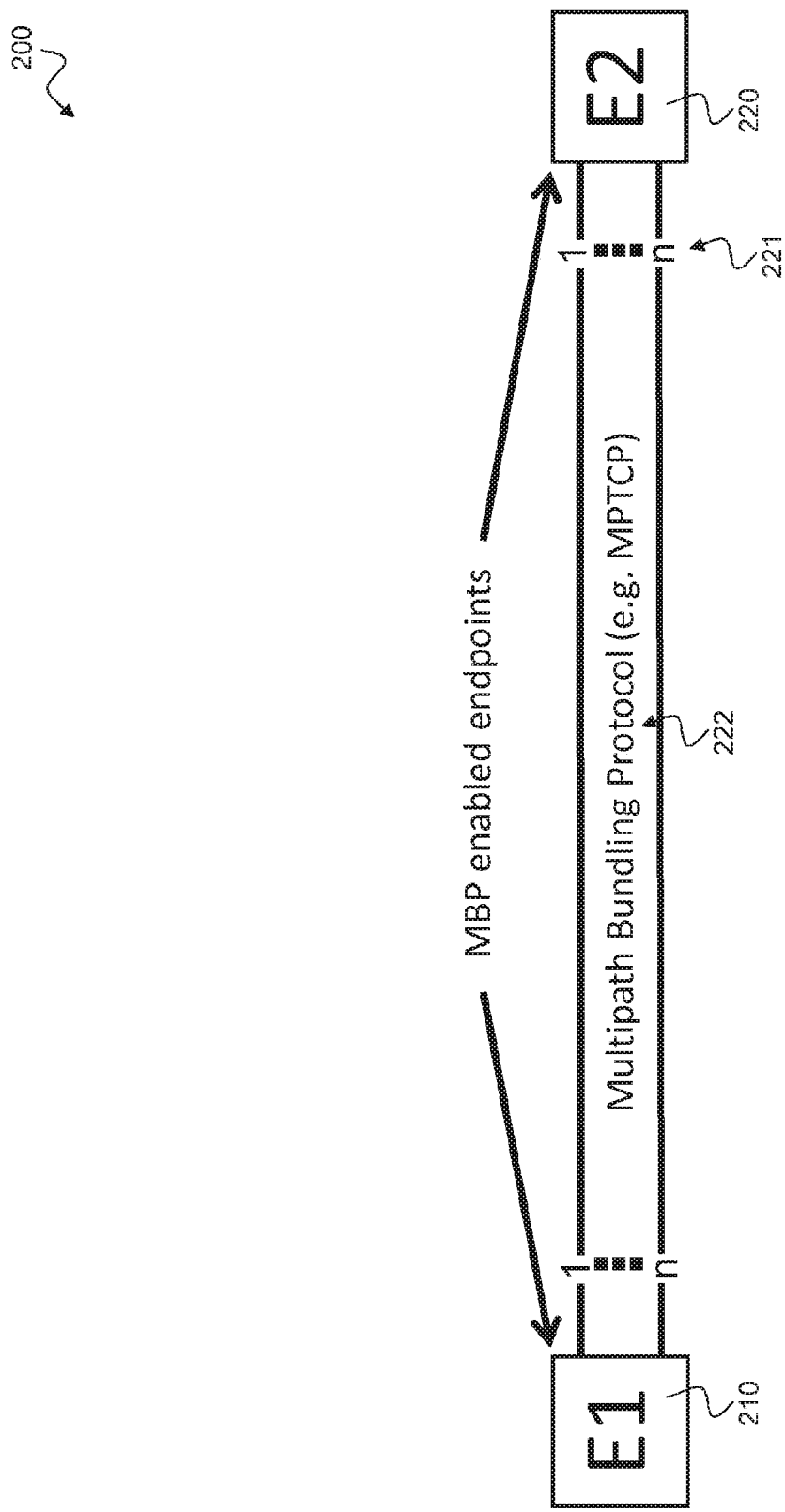
FIG. 2 shows a general architecture for Multipath Transport Control Protocol (MPTCP) 200.

FIG. 2 shows a general architecture for Multipath Transport Control Protocol (MPTCP) 200. A sender 210 transmits data to a receiver 220 based on a Multipath bundling protocol (MBP) 222. Both sender 210 and receiver 220 include MBP enabled endpoints. Multipath bundling protocols (MBP) 222 have to manage the different paths 221 and contain algorithm(s) for path aggregation. The challenge for such algorithms lies in the data distribution over the paths 221 and, if needed, a reordering unit to bring the data stream in the right order again, such that the receiver 220 can make use of it. MBP 222 can be applied in a single direction or be bi-directional.

Figure 3:
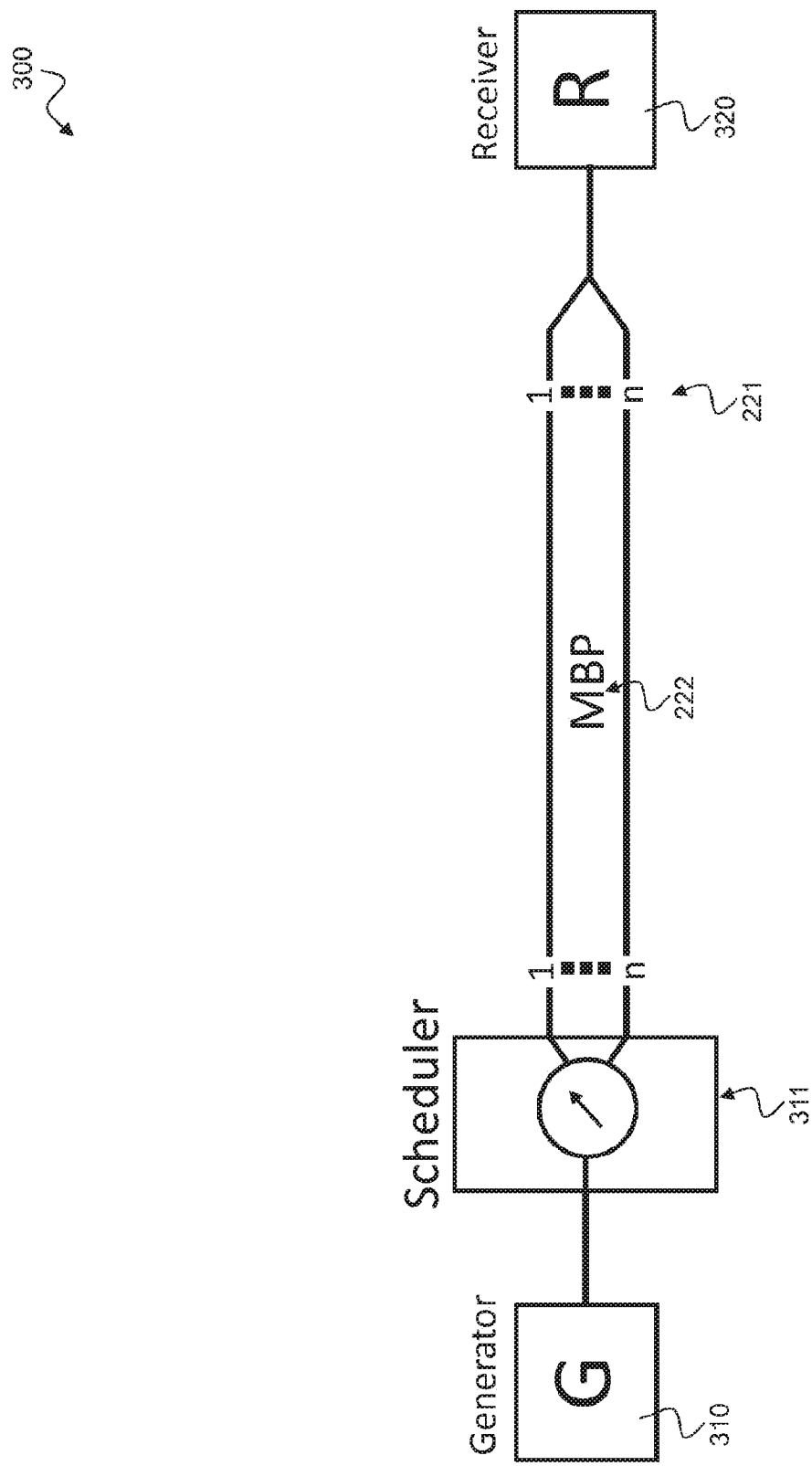
FIG. 3 shows a MBP detailed network architecture 300 with scheduling engine 311.

FIG. 3 shows a MBP detailed network architecture 300 with a scheduling engine 311. A generator 310 generates data for transmission to a receiver 320 based on the Multipath bundling protocol (MBP) 222 as described in FIG. 2. The data generated by generator 310 is scheduled by a scheduler 311 before transmission with the MBP 222. Scheduling 311 (distribution) for MBP 222 occurs on the sender side as shown in FIG. 3.

Figure 4:
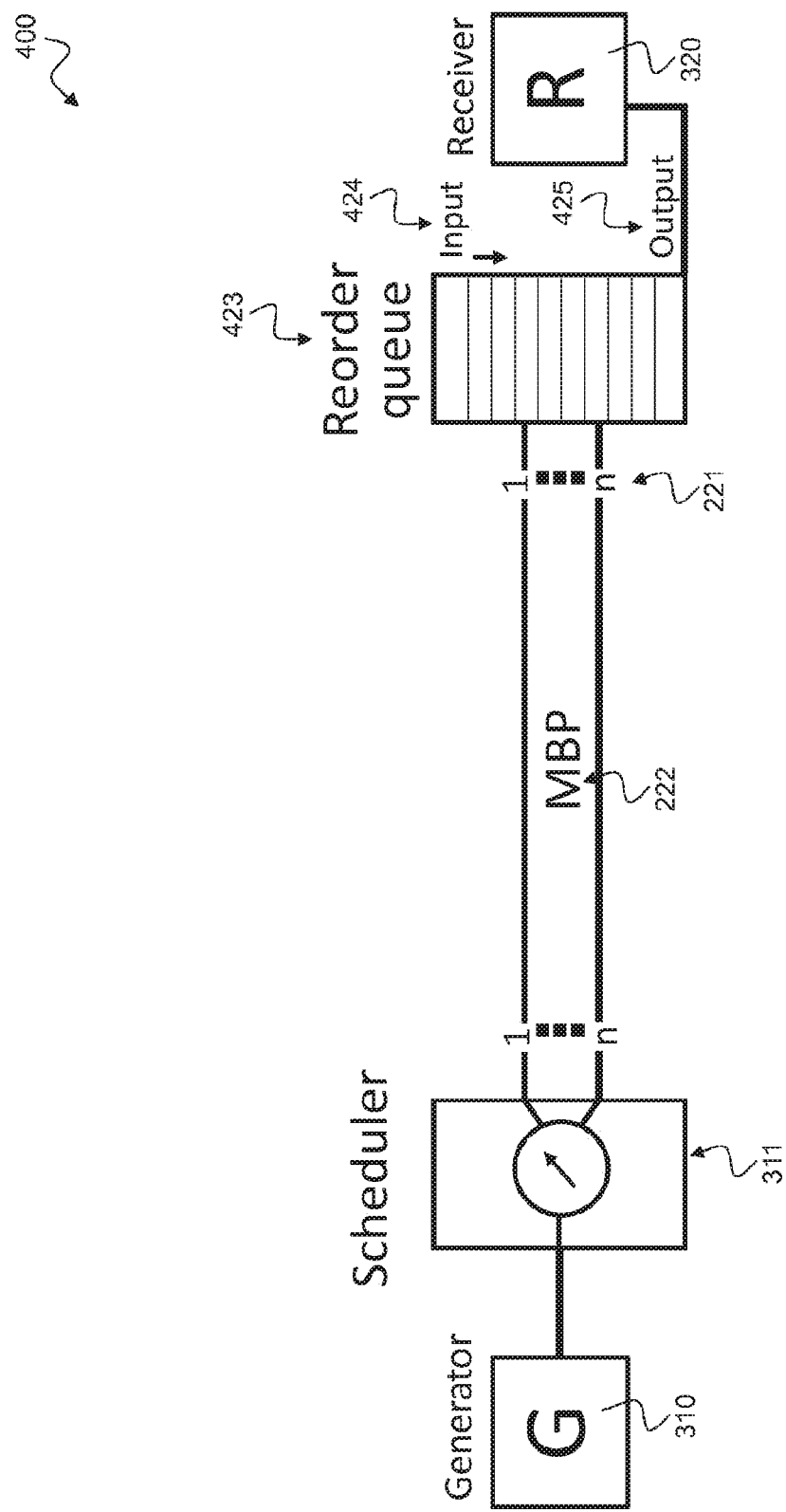
FIG. 4 shows a MBP detailed network architecture 400 with scheduling engine 311 and optional reordering unit 423.

FIG. 4 shows a MBP detailed network architecture 400 with a scheduling engine 311 and optional reordering unit 423. The architecture corresponds to the architecture 300 shown in FIG. 3 with additional reordering unit 423.

For heterogeneous environments where different path characteristics are combined, data scrambling will probably happen. If the distributed higher OSI layer protocols (relatively to the aimed MBP OSI layer) or the services connected through MBP 222 negatively react to data scrambling, it may be helpful to make use of a reordering unit 423 on the receiver 320 side as shown in FIG. 4. Different design goals can be applied for MBPs, such as delivering a high sum throughput/goodput, low latency, ensuring quality, seamless connectivity, etc.

The Multipath Transmission Control Protocol (MPTCP) according to "A. Ford, C. Raiciu, M. Handley, and O. Bonaventure, *TCP Extensions for Multipath Operation with Multiple Addresses*," RFC no. 6824, January 2013" can be applied for MBP, as well as Huawei's GRE Tunnel Bonding Protocol according to "Nicolai Leymann, Cornelius Heidemann, Mingui Zhang, Behcet Sarikaya, Margaret Cullen, *"Huawei's GRE Tunnel Bonding Protocol"*, RFC no. 8157, May 2017". MPTCP is a new proposed standard for a transport layer protocol as an extension to the regular Transmission Control Protocol (TCP). MPTCP enhances network performance, especially if the available throughput on one interface is relatively lower than the application's demand and there is the possibility to use multiple (n)

interfaces to maximize the overall output as shown in FIG. 2. MPTCP exploits the inherent capability of TCP's path estimation and the strict in-order-delivery. The first one helps to design an efficient scheduler because of the permanent knowledge about RTT, CWND, bytes-on-flight and others; the latter keeps the effort for reordering on receiver side small because MPTCP can rely on every part of a stream being received and therefore just needs to wait and put it in the right order. The GRE approach is compared to MPTCP a very static setup, without an extensive signaling such as what TCP provides inherently and is therefore limited to N known (in terms of capacity, RTT/latency is not taken into account) and prioritized paths in combination with one unknown path. The scheduler ensures to fill first the known path(s), before shifting overflowing packets to the unknown path. The reordering queue works with a static time value to equalize latency differences between the paths and tries to ensure in-order-delivery, which may fit or not. In principle, it cannot react dynamically on new challenges from the network paths, like packet loss, bandwidth reduction or latency fluctuation. In addition, it introduces a lot of jitter, if one used path is lossy or latency sensitive. TCP, which could be transferred by Huawei's GRE Tunnel Bonding Protocol, reacts very negatively to this and will reduce speed significantly. Applications based on stateless transport protocols (e.g., UDP) will also struggle with this and may behave like being connected to a disrupted single link.

MPTCP as a strong optimized bundling solution for TCP, which acts near the optimum in terms of efficiency and overhead, is obviously limited to the TCP Protocol. On the other hand, the GRE approach in principle supports the IP-Layer (OSI-Layer3), which is stateless, but lacks in efficiency especially for combining an unknown path. It clearly states that signaling, such as what TCP makes use of (send data and acknowledge it), is needed to optimize scheduling and helps on receiver side to bring data in the correct order. A first rough and easy approach to make MPTCP capable of transporting stateless protocols (IP, UDP . . . ) is tunneling this traffic through a TCP tunnel, which is again distributed over MPTCP. However, this may impose unwanted TCP behavior like retransmission and head-of-line blocking to the tunnel encapsulated traffic, as well if the traffic is already TCP it may cause the TCP meltdown effect, which stops the stream from working.

Figure 5:
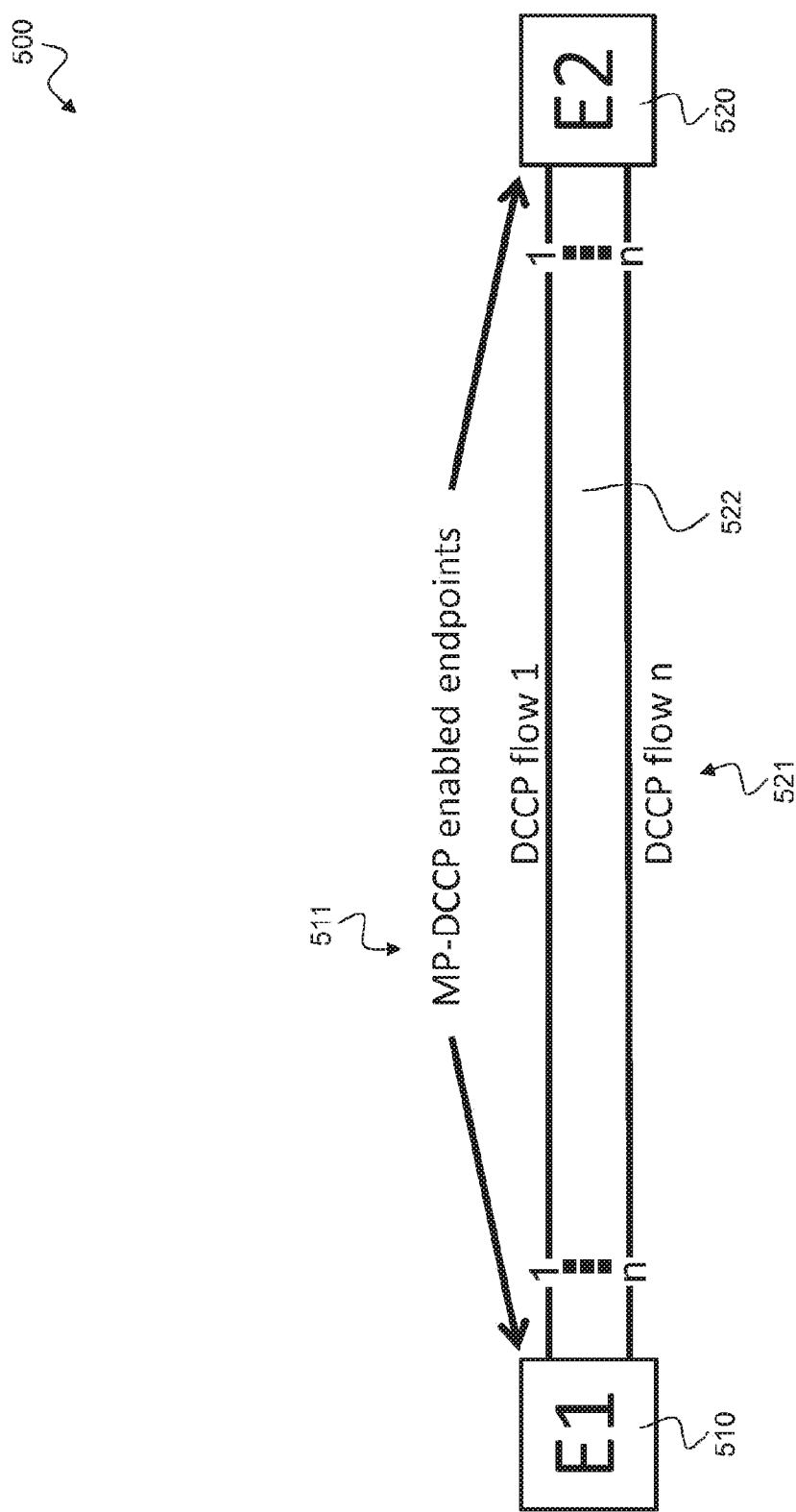
FIG. 5 shows a general architecture of Multipath DCCP 500 according to the disclosure.

FIG. 5 shows a general architecture of Multipath DCCP 500 according to the disclosure. In general terms, a multipath transmission system 500 is shown which includes a first network entity E1, 510 and a second network entity E2, 520. The first network entity 510 is configured to convert an input data stream into a bundle of sub flows 521, e.g., DCCP sub flows, for transmission over a multipath transmission medium 522. The second network entity E2, 520 is configured to reconvert the bundle of sub flows 521 received via the multipath transmission medium 522. The conversion and reconversion are based on a network protocol 511 that provides congestion control without ensuring delivery nor in-order delivery of the bundle of sub flows 521.

In FIG. 5 an implementation is shown that is based on a multipath datagram congestion control protocol (MP-DCCP) as network protocol. MP-DCCP is a multipath extension of the plain old Datagram Congestion Control Protocol (DCCP) according to "E. Kohler, M. Handley, S. Floyd, *Datagram Congestion Control Protocol (DCCP)*", RFC no. 4340, March 2006" which is a network protocol that inherits congestion control from TCP without ensuring delivery. This behavior exactly matches the requirements of path estimation without imposing flow control. This mechanism of the standardized protocol DCCP, is developed further towards a multipath capable protocol MP-DCCP in accordance with the present disclosure. MP-DCCP creates several DCCP flows 521 as a bundle and respectively manages them. The DCCP network protocol as such needs no special extensions which changes the standard.

The solution shown in FIG. 5 is able to distribute non-reliable traffic over multiple paths efficiently, as described hereinafter. The multipath transmission system 500 shown in FIG. 5 bundles multiple unknown and fluctuating paths into a single logical path efficiently. Compared to the individual single path usage a goodput gain can be achieved by this solution. Additionally, traffic steering mechanisms such as path prioritization, latency reduction or robustness can be applied as described in the following. The solution for MBP as described hereinafter exploits the well working TCP channel estimation and at the same time offers transfer of non-reliable protocols like UDP or IP without imposing TCP behavior, which repeal the non-reliable properties.

Figure 6:
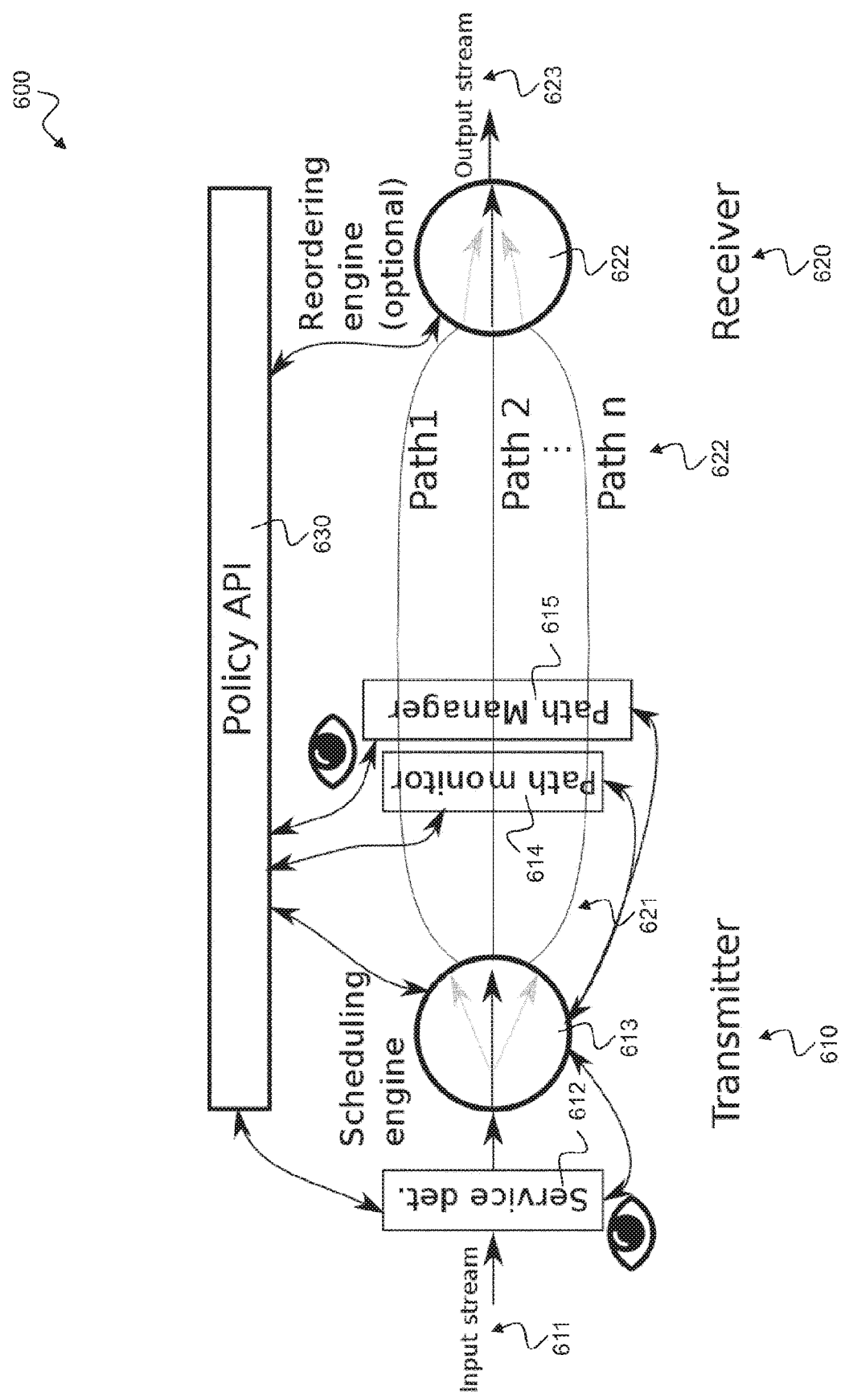
FIG. 6 shows a detailed architecture of Multipath DCCP 600 according to the disclosure.

FIG. 6 shows a detailed architecture of Multipath DCCP 600 for transmitter 610 and receiver 620 sides according to the disclosure. MP-DCCP 600 includes an optional service detector 612, a path manager 615, a path monitor 614, a scheduler engine 613, an optional reordering engine 622 and a policy application interface 630. On the transmitter side 610, the service detection module 612 can differentiate services based on characteristics like source, destination, deep packet inspection, traffic pattern, etc. and mark the packages to be handled in the scheduler 613 accordingly. The path manager 615 is responsible to detect n available paths towards the destination, manage them and make them available to the scheduler engine 613 which creates n DCCP flows 621. The scheduler 613 includes the decision logic for distributing units of payload (from the input stream 611) on the available paths 622 and can use therefore the information of the per path monitoring 614. The monitoring 614 itself at least keeps track of capacity, latency, jitter and loss. On receiver side 620, an optional reordering engine 622 can be used to equalize different path characteristics, e.g., to mitigate latency spikes, scrambling or packet loss. Such reordering engine 622 is not mandatory and can be avoided, e.g., by a good working scheduler 613, which equalizes beforehand or by usage of paths with same characteristic.

The policy interface 630, which can exist on the sender 610 and receiver 620 sides and can be connected or individual, can affect all the other MP-DCCP components by defining, e.g.:

Service detection 612 (one or a combination of following options):
 Traffic pattern
 OSI Layer protocol identifier
 OSI Layer header identifier
 Payload identifier
 Etc.
Path manager 615 (one or a combination of following options):
 Number of path
 Kind of path, e.g. mobile, fixed etc.
 Latency threshold
 Capacity threshold
 Whitelist, e.g. IP-addresses
 Blacklist, e.g. IP-addresses
 Set (per path) congestion control
 Etc.
Scheduler engine 613 (one or a combination of following options):
 Flow/stream/packet based scheduling
 Service based scheduling Path prioritization
Flow prioritization
Application prioritization
Low latency prioritization
Robustness and min latency
Round-Robin
In order delivery (avoid reordering)
Traffic shaping
Path offloading
Etc.

Reassembly engine unit (one or a combination of following options):
Max. equalization time
Static/dynamic equalization
Buffer size
On/Off
Etc.

The individual components of MP-DCCP 600 as defined above can exchange information with each other.

Figure 8:
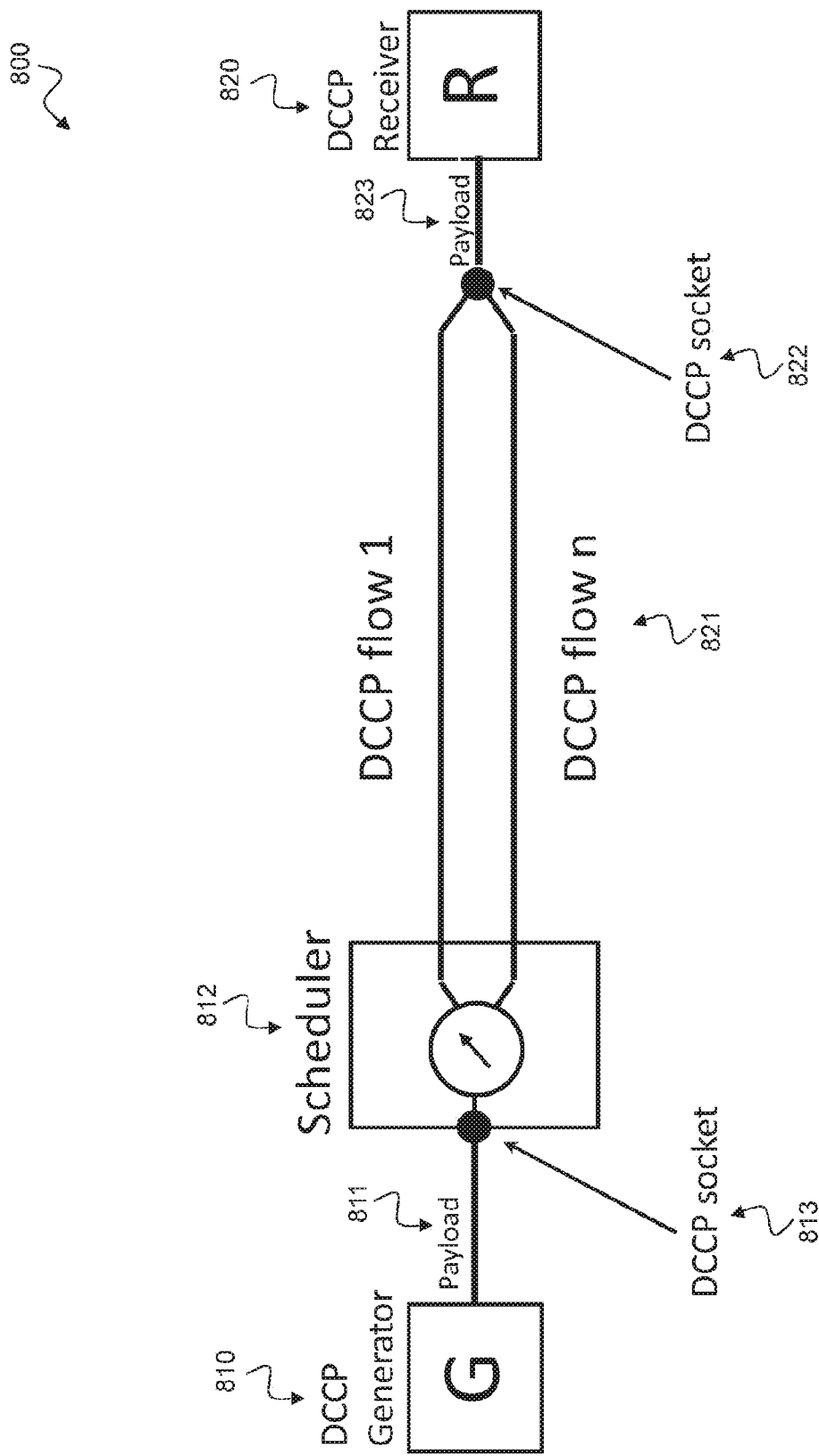
FIG. 8 shows a Multipath DCCP 800 with direct DCCP application usage according to the disclosure.

FIG. 7 shows a Multipath DCCP encapsulation converter 700 according to the disclosure. A generator 710 generates an input data stream 711 for transmission to a receiver 720. On the transmitter side a scheduler and encapsulation module 712 is used to encapsulate the input data stream 711 into DCCP before creating the bundle of DCCP sub flows 721 for transmission over the multipath transmission medium. On the receiver 720 side a decapsulation module 722 decapsulates the reassembled data output data stream before providing it to the receiver 720. Transferring traffic via MP-DCCP has options. Either encapsulate any traffic into DCCP or make direct use by DCCP applications on both ends. The first solution is depicted in FIG. 7 while the second solution is depicted in FIG. 8. The encapsulation option according to FIG. 7 has the advantage of being OSI-Layer2 or OSI-Layer3 capable, without imposing adverse side effects like flow control or similar. Generator 710 end "scheduler+encapsulation" engine 712 can be placed in separate devices, as well as the "decapsulation engine" 722 and the receiver 720.

The Multipath DCCP encapsulation converter 700 can for example be applied for node-to-node data traffic, e.g., between network nodes such as gateways that use OSI Layer 2 or OSI Layer 3 traffic. Incoming higher layer data traffic can be encapsulated into OSI Layer 2 or OSI Layer 3 traffic for transportation between the two network nodes. No higher layer network protocols have to be implemented in the network nodes, e.g., the gateways.

FIG. 8 shows a Multipath DCCP 800 with direct DCCP application usage according to the disclosure. A DCCP generator 810 generates a DCCP input data stream 811 for transmission to a DCCP receiver 820. On the transmitter side a scheduler 812 (without encapsulation) is used to create the bundle of DCCP sub flows 821 for transmission over the multipath transmission medium. On DCCP receiver 820 side the DCCP flows 821 are reassembled to provide the output data stream with payload 823 to the DCCP receiver 820. A socket API 822 may be utilized to achieve this. The Multipath DCCP 800 can for example be applied for end-to-end data traffic, e.g., with respect to a browser 810 for downloading a video stream from a network server 820. Both devices 810, 820 use OSI layer 4 traffic such as DCCP, hence no encapsulation is required.

Figure 9:
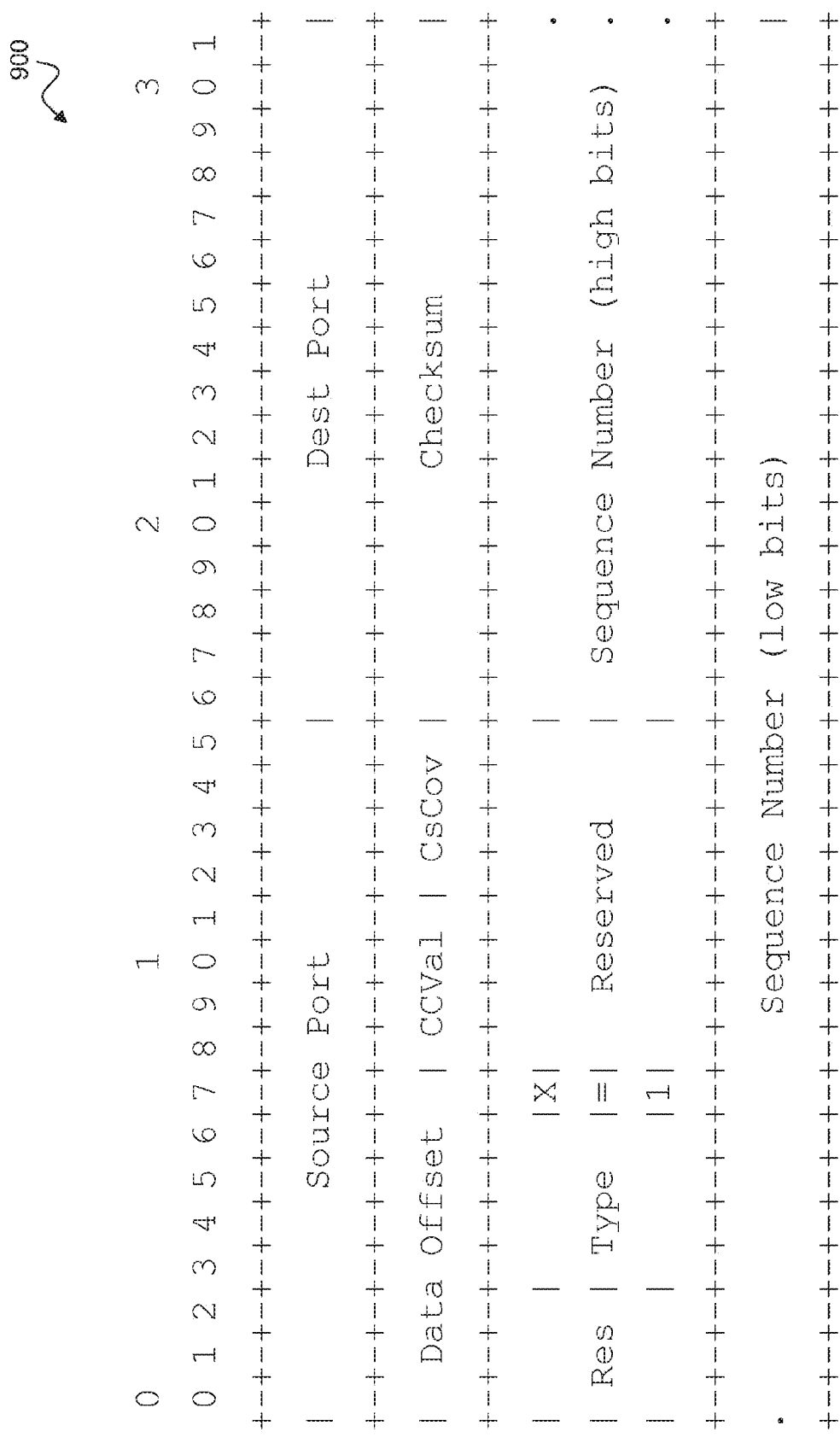
FIG. 9 shows a schematic diagram illustrating a DCCP generic extended header 900 according to Internet Engineering Task Force (IETF) RFC4340.

FIG. 9 shows a schematic diagram illustrating DCCP generic extended header 900 according to IETF RFC4340. The extended header 900 includes various data fields as shown in FIG. 9. The data fields include: a 16 bit source port, a 16 bit destination port, a data offset field, a CCVal field, a CsCov field, a checksum field, a reserved data field, a type field, an X field, a further reserved data field, a sequence number (high bits) and a sequence number (low bits).

The DCCP generic header 900 includes sequencing by maintaining a "Sequence Number" per datagram and is either 48 bits (extended header) or 24 bits long. An optional reordering on the receiver side, e.g., as described above with respect to FIG. 6, is a functionality that is very useful to bring portions of payload in the order they were sent from the originator. To optimize the reordering process, an overall sequencing may be helpful which can be added by using an existing DCCP option, e.g., as described on page 30 of "E. Kohler, M. Handley, S. Floyd, *Datagram Congestion Control Protocol (DCCP)*", RFC no. 4340, March 2006" or by defining a new one. For example, one of the reserved bit fields or the type bit field of the DCCP generic header 900 can be used by the transmitter to indicate the overall sequencing to the receiver. The receiver can remove the indicated value from the DCCP generic header 900 in order to be DCCP standard compatible.

Figure 10:
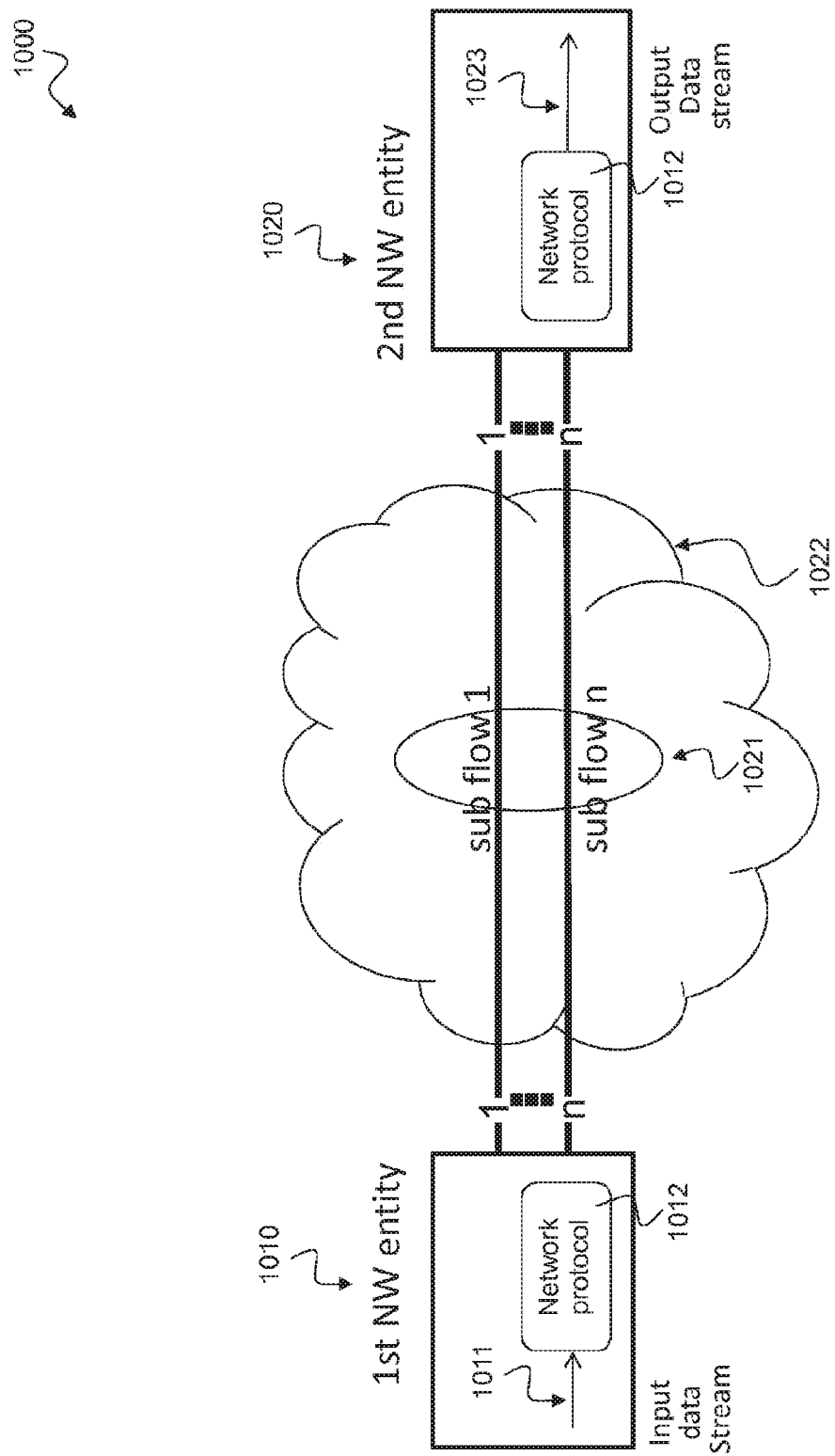
FIG. 10 shows a general architecture of a multipath transmission system 1000 according to the disclosure.

FIG. 10 shows a general architecture of a multipath transmission system 1000 according to the disclosure. The multipath transmission system 1000 includes a first network entity 1010 and a second network entity 1020. The first network entity 1010 is configured to convert an input data stream 1011 into a bundle of sub flows 1021 for transmission over a multipath transmission medium 1022. The second network entity 1020 is configured to reconvert the bundle of sub flows 1021 received via the multipath transmission medium 1022 into an output data stream 1023. The conversion and reconversion are based on a network protocol 1012 that provides congestion control without ensuring delivery nor in-order delivery of the bundle of sub flows 1021.

The input data stream 1011 may be received from an external source or may alternatively be generated internally in the first network entity 1010. The output data stream 1023 may be transmitted to an external device or may alternatively be terminated in the second network entity 1020.

The network protocol 1012 may be a multipath extension of a Datagram Congestion Control Protocol (DCCP). The network protocol 1012 is based on non-reliable delivery of the bundle of sub flows 1021 (i.e., delivery of each data packet cannot be guaranteed).

The network protocol 1012 may be based on service detection 612, e.g., as described above with respect to FIG. 6, which is configured to detect services included in the input data stream 1011, wherein the services are detected based on at least one of the following characteristics of the input data stream 1011: source address, destination address, deep packet inspection, traffic pattern.

The network protocol 1012 may be based on path management 615, e.g., as described above with respect to FIG. 6, which is configured to detect and manage available paths of the multipath transmission medium 1022 towards the second network entity 1020.

The network protocol 1012 may be based on scheduling 613, e.g., as described above with respect to FIG. 6, which is configured to distribute payload units of the input data stream 1011 on the available paths of the multipath transmission medium 1022 based on a decision logic to create the bundle of sub flows 1021.

The network protocol 1012 may be based on per path monitoring 614, e.g., as described above with respect to FIG. 6, which is configured to monitor at least one of the following parameters of paths of the multipath transmission medium 1022: capacity, latency, jitter and loss. The decision logic may be based on information from the per path monitoring 614, e.g., as described above with respect to FIG. 6.

The network protocol 1012 may be based on reordering 622, e.g., as described above with respect to FIG. 6, which is configured to reorder the bundle of sub flows 1021 received at the second network entity 1020 according to a predefined sequencing, in particular according to an overall sequencing.

The network protocol 1012 may include a policy interface 630, e.g., as described above with respect to FIG. 6, which is configured to determine a policy of the service detection 612, the path management 615, the scheduling 613 and/or the reconversion of the bundle of sub flows 1021 into the output data stream 1023, e.g., as described above with respect to FIG. 6.

The policy of the service detection 612 may be based on one or a combination of the following options: traffic pattern of the input data stream 1011, OSI layer protocol identifier of the input data stream 1011, OSI layer header identifier of the input data stream 1011, payload identifier of the input data stream 1011, e.g., as described above with respect to FIG. 6.

The policy of the path management 615 may be based on one or a combination of the following options: number of paths of the multipath transmission medium 1022, type of paths of the multipath transmission medium 1022 (in particular mobile or fixed), latency threshold, capacity threshold, whitelist (in particular allowable IP-addresses of paths of the multipath transmission medium 1022), blacklist (in particular blocked IP-addresses of paths of the multipath transmission medium 1022), per path setting of congestion control for the multipath transmission medium 1022, e.g., as described above with respect to FIG. 6.

The policy of the scheduling 613 may be based on one or a combination of the following options: flow based scheduling, stream based scheduling, packet based scheduling, service based scheduling, path prioritization, flow prioritization, application prioritization, low latency prioritization, robustness and minimum latency, round-robin, in-order delivery to avoid reordering, traffic shaping, path offloading, e.g., as described above with respect to FIG. 6.

The policy of the reconversion of the bundle of sub flows 1021 into the output data stream 1023 may be based on one or a combination of the following options: maximum equalization time, static or dynamic equalization, buffer size, on or off, e.g., as described above with respect to FIG. 6.

The first network entity 1010 may be configured to convert an input data stream 1011 comprising an OSI layer 4 payload 811 into the bundle of sub flows 1021 without encapsulation, e.g., as described above with respect to FIG. 8. The first network entity 1010 may be configured to encapsulate an input data stream 1011 comprising an OSI layer 2 or OSI layer 3 payload into OSI layer 4, in particular DCCP, before conversion into the bundle of sub flows 1021, e.g., as described above with respect to FIG. 7.

In FIG. 10, the first network entity 1010 also represents a network device 1010 for converting an input data stream 1011 into a bundle of sub flows 1021 for transmission over a multipath transmission medium 1022. Such a network device 1010 may include a path manager 615, a scheduling module 613 and a path monitor 614 as described above with respect to FIG. 6. The path manager 615 is configured to detect and manage available paths of the multipath transmission medium 1022. The scheduling module 613 is configured to distribute payload units of the input data stream 1011 on the available paths of the multipath transmission medium 1022 based on a decision logic to create the bundle of sub flows 1021. The path monitor 614 is configured to monitor at least one of the following parameters of paths of the multipath transmission medium 1022: capacity, latency, jitter and loss, wherein the decision logic is based on information from the path monitor 614.

The network device 610 may include a policy interface 630, e.g., as described above with respect to FIG. 6, in particular a policy application program interface (API), which is configured to determine a policy of the path manager 615, the scheduling module 613 and/or the path monitor 614.

The path manager 615, the scheduling module 613 and the path monitor 614 may be configured to implement a network protocol 511, e.g., as described above with respect to FIGS. 5 and 6, that is based on non-reliable delivery of the bundle of sub flows 1021, in particular a multipath extension of a Datagram Congestion Control Protocol (DCCP).

The network device 610 may include further functional blocks as described above with respect to FIG. 6.

Figure 11:
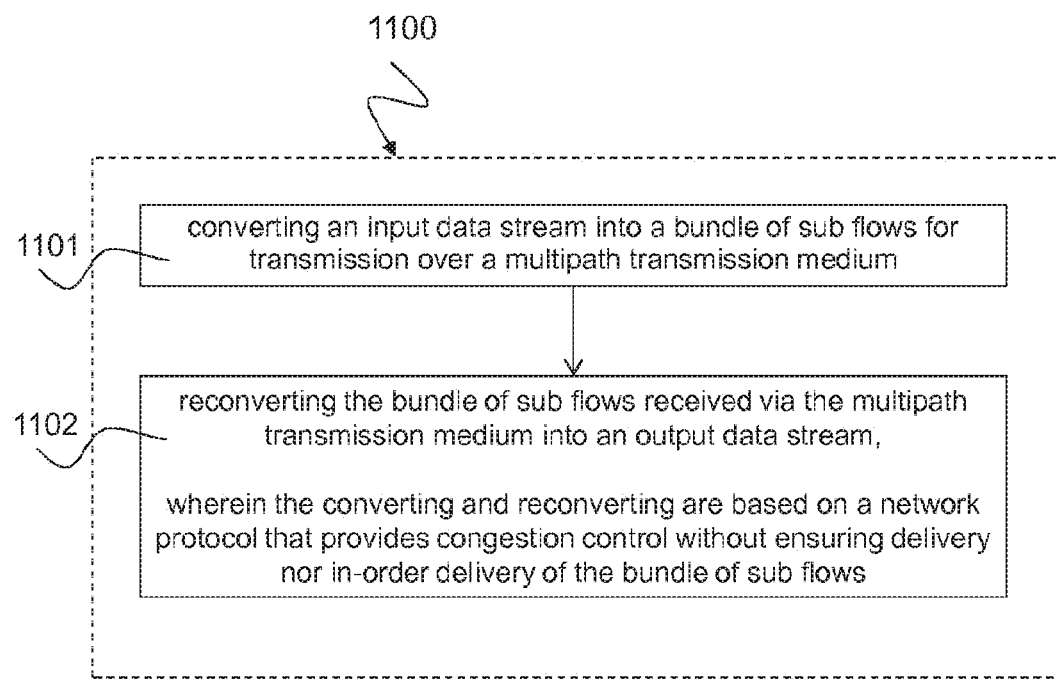
FIG. 11 shows a schematic diagram illustrating a method 1100 for multipath transmission according to the disclosure.

FIG. 11 shows a schematic diagram illustrating a method 1100 for multipath transmission according to the disclosure.

The method 1100 includes a first step: converting 1101 an input data stream into a bundle of sub flows for transmission over a multipath transmission medium, e.g., as described above with respect to FIGS. 5 to 10. The method 1100 includes a second step: reconverting 1002 the bundle of sub flows received via the multipath transmission medium into an output data stream, wherein the converting and reconverting are based on a network protocol that provides congestion control without ensuring delivery nor in-order delivery of the bundle of sub flows, e.g., as described above with respect to FIGS. 5 to 10.

The method 1100 may include further steps, such as, for example, according to the computing blocks described above with reference to FIGS. 5 to 10.

Another aspect of the invention is related to a computer program product comprising program code for performing the method 1100 or the functionalities described above, when executed on a computer or a processor. The method 1100 may be implemented as program code that may be stored on a non-transitory computer medium. The computer program product may implement the techniques described above with respect to FIGS. 5 to 10.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A multipath transmission system, comprising:
a first network device configured to:
encapsulate input Open Systems Interconnection (OSI) layer 2 or layer 3 data traffic into OSI layer 4 data traffic, wherein the OSI layer 4 data traffic is Datagram Congestion Control Protocol (DCCP) data traffic; and
convert the OSI layer 4 data traffic into a bundle of sub flows for transmission over a multipath transmission medium; and
a second network device configured to reconvert the bundle of sub flows received via the multipath transmission medium into an output data stream;
wherein the conversion and reconversion are based on a network protocol that provides congestion control without ensuring delivery nor in-order delivery of the bundle of sub flows, wherein the network protocol is a multipath extension of a DCCP.

2. The multipath transmission system of claim 1, wherein implementation of the network protocol includes detecting services included in the input OSI layer 2 or layer 3 data traffic, wherein the detected services are detected based on at least one of the following characteristics of the input OSI layer 2 or layer 3 data traffic: source address, destination address, deep packet inspection, or traffic pattern.

3. The multipath transmission system of claim 2, wherein implementation of the network protocol includes detecting and managing available paths of the multipath transmission medium towards the second network device.

4. The multipath transmission system of claim 3, wherein implementation of the network protocol includes distributing payload units of the OSI layer 4 data traffic on the available paths of the multipath transmission medium to create the bundle of sub flows.

5. The multipath transmission system of claim 4, wherein implementation of the network protocol includes per path monitoring of at least one of the following parameters of paths of the multipath transmission medium: capacity, latency, jitter, quality or loss;
wherein distribution of the payload units is based on information from the per path monitoring.

6. The multipath transmission system of claim 4, wherein implementation of the network protocol includes determining a policy for service detection, path management, scheduling and/or reconversion of the bundle of sub flows into the output data stream.

7. The multipath transmission system of claim 6, wherein implementation of the network protocol includes determining a policy for service detection, and wherein the policy for service detection is based on one or a combination of the following: traffic pattern, OSI layer protocol identifier, OSI layer header identifier, or payload identifier.

8. The multipath transmission system of claim 1, wherein the first network device is further configured to encapsulate a stateless input data stream for a stateless transmission of the encapsulated stateless input data stream without impressing stateful characteristics of the DCCP protocol.

9. The multipath transmission system of claim 4, wherein implementation of the network protocol includes determining a policy for path management, and wherein the policy for path management is based on one or a combination of the following: number of paths of the multipath transmission medium, type of paths of the multipath transmission medium, latency threshold, capacity threshold, whitelist, blacklist, or per path setting of congestion control for the multipath transmission medium.

10. The multipath transmission system of claim 4, wherein implementation of the network protocol includes determining a policy for scheduling, and wherein the policy for scheduling is based on one or a combination of the following: flow based scheduling, stream based scheduling, packet based scheduling, service based scheduling, path prioritization, flow prioritization, application prioritization, low latency prioritization, robustness and minimum latency, round-robin, in-order delivery to avoid reordering, traffic shaping, or path offloading.

11. The multipath transmission system of claim 4, wherein implementation of the network protocol includes determining a policy for reconversion of the bundle of sub flows into the output data stream, and wherein the policy for reconversion of the bundle of sub flows into the output data stream is based on one or a combination of the following: maximum equalization time, static or dynamic equalization, buffer size, or on or off.

12. A multipath transmission system, comprising:
a first network device configured to convert an input data stream comprising an Open Systems Interconnection (OSI) layer 4 payload into a bundle of sub flows without encapsulation for transmission over a multipath transmission medium; and
a second network device configured to reconvert the bundle of sub flows received via the multipath transmission medium into an output data stream;
wherein the conversion and reconversion are based on a network protocol that provides congestion control without ensuring delivery nor in-order delivery of the bundle of sub flows;
wherein the network protocol is a multipath extension of a Datagram Congestion Control Protocol (DCCP);
wherein the first network device is further configured to:
add an overall sequencing into an existing DCCP option which is transmitted to the second network device; or
use one of reserved bit fields or a type bit field of a DCCP generic header to indicate the overall sequencing to the second network device; and
wherein the second network device is further configured to reorder the sub flows according to the overall sequencing to provide the output data stream in a correct order.

13. A multipath transmission system, comprising:
a first network device configured to convert input OSI layer 4 data traffic without encapsulation into a bundle of sub flows for transmission over a multipath transmission medium; and
a second network device configured to reconvert the bundle of sub flows received via the multipath transmission medium into an output data stream;
wherein the conversion and reconversion are based on a network protocol that provides congestion control without ensuring delivery nor in-order delivery of the bundle of sub flows, wherein the network protocol is a multipath extension of a Datagram Congestion Control Protocol (DCCP).

* * * * *